United States Patent [19]

Schneeberger

[11] Patent Number: 4,723,314

[45] Date of Patent: Feb. 2, 1988

[54] HETERODYNE LASER DETECTION

[75] Inventor: Richard F. Schneeberger, Snyder, N.Y.

[73] Assignee: Calspan Corporation, Buffalo, N.Y.

[21] Appl. No.: 732,776

[22] Filed: May 10, 1985

[51] Int. Cl.$^4$ .............................................. H04B 9/00
[52] U.S. Cl. ...................................... 455/619; 455/617
[58] Field of Search ...................... 455/619, 617, 164

[56] References Cited

U.S. PATENT DOCUMENTS

| | | | |
|---|---|---|---|
| 3,426,207 | 2/1969 | Fried et al. | 455/619 |
| 3,737,787 | 6/1973 | Wolfram | 455/164 |
| 3,766,380 | 10/1973 | Menzies | 250/343 |
| 3,856,406 | 12/1974 | Noble et al. | 356/106 S |
| 3,864,636 | 2/1975 | Fukuda et al. | 455/164 |
| 3,875,399 | 4/1975 | Teich | 455/619 |
| 4,115,006 | 9/1978 | Reymond et al. | 356/152 |
| 4,298,280 | 11/1981 | Harney | 356/5 |
| 4,313,216 | 1/1982 | Jaeger et al. | 455/226 |

OTHER PUBLICATIONS

Mandel; *Journal of the Optical Society of America;* "Heterodyne Detection of a Weak Light Beam;" Sep., 1966;-vol. 56; No. 9; pp. 1200-1206.

Primary Examiner—Joseph A. Orsino, Jr.
Attorney, Agent, or Firm—Biebel, French & Nauman

[57] ABSTRACT

A heterodyne laser detection system includes a local oscillator laser, an infrared light detector positioned to receive light transmitted through a receiving window and also from the local oscillator laser and to generate heterodyne signals in response thereto. An oscillator controller repeatedly sweeps the frequency of the local oscillator laser to ensure that the laser signal being sought generates heterodyne signals within the limited passband of an intermediate frequency amplifier. Upon detecting heterodyne signals amplified by the intermediate frequency amplifier above a defined threshold, the oscillator control switches to control the local oscillator laser to track the detected laser signal such that the heterodyne signals remain within the passband of the intermediate frequency amplifier.

7 Claims, 4 Drawing Figures

HETERODYNE LASER DETECTION

BACKGROUND OF THE INVENTION

This invention relates generally to heterodyne laser detection systems and, more particularly, to an improved heterodyne laser detection system wherein a laser to be detected traverses a transmission path including a high temperature transmissive component which emits thermal radiation. The improved heterodyne laser detection system is particularly applicable for use in a high speed homing missile having an infrared receiving dome or window which is aerodynamically heated to high temperatures and therefore will be described herein with reference to such application.

Due to improved technology and the relatively elementary state of development of countermeasures, lasers are replacing radar for the guidance of high speed missiles used for a variety of military applications. For example, a laser designator typically within the infrared region of the electromagnetic frequency spectrum, may be directed upon a target with the reflected laser designator signal from the target being intercepted by a homing missile. For high speed homing missiles, however, a problem may be encountered due to the high temperatures of the missile's infrared receiving dome or window which high temperatures are created by aerodynamic heating.

The total flux emitted by the infrared window is proportional to the temperature of the window to the 4th power and may even be higher if the emissivity of the infrared window increases with increasing temperature. A portion of the total power of the emissions from the window fall within the bandwidth of an infrared light detector which is utilized to sense the laser designator signal so that the detector average current rises nearly as temperature to the 4th power and the noise current rises approximately as the square root of the average current or nearly as temperature to the 2nd power. Such noise levels are in addition to ambient noise and cause standard broadband infrared detection techniques to fail.

Heterodyne type receivers have been used to provide limited bandwidth reception and, hence, overcome ambient noise as well as noise due to emissions from a heated window. However, if the bandwidth is sufficiently limited to ensure freedom from interfering noise, then the signal to be detected may not be within the receiver bandwidth due to frequency variations caused by doppler shifts and system tolerances.

Thus, the need exists for an improved laser detection or seeking system for use for example in a high speed homing missile having an infrared receiving window which is aerodynamically heated to high temperatures resulting in interfering thermal emissions from the window.

SUMMARY OF THE INVENTION

In accordance with the present invention, an improved heterodyne laser detection system provides a sufficiently narrow bandwidth to prevent interference by ambient background noise supplemented by infrared noise radiation from a heated signal transmissive component. Laser detection is ensured by sweeping a local oscillator laser through a range of frequencies such that during a part of the sweep the resulting intermediate frequencies or heterodyned signals will pass through a limited frequency passband of an intermediate frequency amplifier. When heterodyned signals within the passband of the intermediate frequency amplifier are detected, the signals are employed to control the local oscillator laser frequency so that the heterodyned signals will remain within the passband of the intermediate frequency amplifier. The system is intended for use where narrow optical passbands are required, for example, in a laser seeking system for a high speed homing missile having an infrared light receiving window which is aerodynamically heated to high temperatures resulting in thermal emissions from the window.

The improved heterodyne laser detection or seeking system of the present invention comprises local oscillator laser means and infrared light detector means positioned to receive light transmitted through the transmissive component or infrared window and also light generated by the local oscillator laser. In response to these signals, the light detector means generates heterodyned signals. The heterodyned signals generated by the infrared light detector within a selected frequency passband are amplified by intermediate frequency amplifier means. Oscillator control means repeatedly vary or sweep the frequency of the local oscillator laser over a range of frequencies to ensure that the laser signal being sought generates heterodyned signals within the passband of the intermediate frequency amplifier. The oscillator control includes means for controlling the frequency the local oscillator laser in response to amplified heterodyned signals within the passband of the intermediate frequency amplifier such that the heterodyned signals remain within the passband.

In accordance with one aspect of the present invention, the oscillator control comprises modulator means for controlling the frequency of the output signal of the local oscillator laser, sweep means for controlling the modulator to sweep the frequency of the output signal of the local oscillator laser over a range of frequencies corresponding to the laser being sought, frequency tracker means for controlling the modulator in response to amplified heterodyned signals from the intermediate amplifier, and switch means for switching from the sweep means to the frequency tracker means such that the laser detection or seeking system may be locked onto the laser signal.

In accordance with another aspect of the present invention, the improved heterodyne laser detection or seeking system further comprises acquisition signal detector means for generating an acquisition signal in response to predefined levels of heterodyned signals amplified by the intermediate frequency amplifier. The switch means being responsive to the acquisition signal to switch control of the modulator from the sweep means to the frequency tracker means. Thus, by employing a frequency tracker, the local oscillator frequency can be made to track the received laser frequency thereby to contain the heterodyne output signals within the passband of the narrow band intermediate frequency amplifier following the heterodyning mixer-local oscillator combination.

The system in accordance with the present invention thus permits the detection of laser light in a noisy environment wherein, for example, thermal emissions from a high temperature transmissive component or window supplement the ambient noise incident on the infrared light detector. The frequency of the local oscillator of a limited frequency bandwidth heterodyne receiver is varied such that a laser signal within a potential frequency range will be detected. Once the laser signal is detected, the frequency of the local oscillator laser is forced to track the laser signal and thereby lock the laser detection system onto the signal.

To improve the overall performance of the improved heterodyne laser detection or seeking system in accordance with the present invention, a narrow bandwidth optical bandpass filter may be positioned between the transmissive component or window and the infrared light detector such that thermal emissions from the heated window incident upon the light detector are reduced to improve the signal-to-noise ratio of the light signal reaching the light detector.

It is, therefore, an object of the present invention to provide an improved heterodyne laser detection or seeking system for use, for example, in a high speed homing missile having an infrared light receiving window which is aerodynamically heated to high temperatures resulting in thermal emissions from the window wherein a local oscillator laser is initially swept through a band of frequencies such that the laser signal being sought will be detected through the generation of heterodyned signals by an infrared light detector which receives light through the high temperature window as well as light from the local oscillator with the local oscillator being controlled by a frequency tracker upon target acquisition which is signaled by heterodyned signals within a selected frequency passband being amplified to a selected threshold level by an intermediate frequency amplifier.

Other objects and advantages of the present invention will be apparent from the following description, the accompanying drawings and the appended claims.

BRIEF DESCRIPTION OF THE DRAWINGS

FIG. 3 shows the insertion of an optical bandpass filter used to improve the signal-to-noise ratio of the received light signal for the improved heterodyne laser seeking system of the present invention.

FIG. 4 is a frequency-to-voltage transfer function curve for the frequency tracker of the present invention.

DETAILED DESCRIPTION OF THE INVENTION

Figure 1:
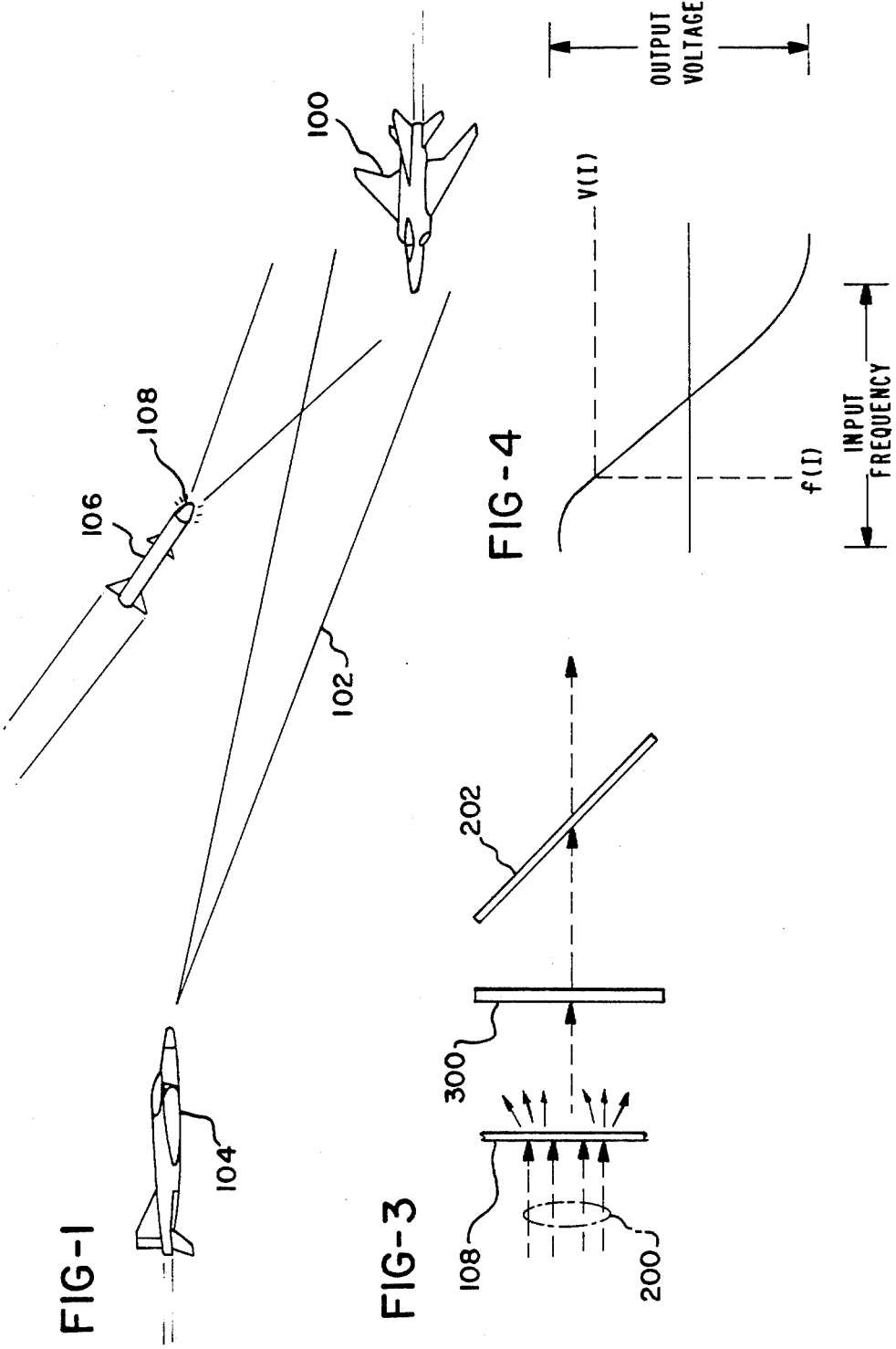
FIG. 1 depicts an applicable environment for use of the present invention.

FIG. 1 illustrates an environment in which the present invention is particularly applicable. A target 100 in this case comprising an airplane is being observed and illuminated by a laser designator 102 in this case carried on board a second aircraft 104. A portion of the designator laser 102 is reflected and received by a high speed homing missile 106. An infrared receiving dome 108 is heated to high temperatures due to aerodynamic heating caused by the high speed of the homing missile 106. Due to the high temperatures of the infrared receiving dome or window 108 of the missile 106, flux is emitted by the window at a rate proportional to the temperature of the window 108 to the 4th power and may even be higher if the emmisivity of the window increases with increasing temperature.

The described application contemplates missile operation up to an altitude of approximately 70,000 feet, i.e., in the atmosphere, which leads to aerodynamic heating for high speeds; however, the invention as described in the present application may also be employed for space applications beyond the atmosphere. It is noted that while the present invention is particularly applicable to the described high speed homing missile application, it is generally applicable to infrared communications over paths which may introduce doppler or other frequency shifts and may contain a transmissive component which possesses a high temperature and, hence, may tend to interfer with the communications due to thermal emissions.

The present invention effectively expands the narrow bandwidth of a laser detection or seeking system for initial acquisition of a laser signal to be detected. The narrow bandwidth of the system is obtained by employing heterodyning and the coherence or narrow line width characteristics of some lasers, for example, the $CO_2$ laser. The laser radiation to be detected is derived from one line of a $CO_2$ laser which is scattered from a target, in accordance with the designator concept previously described. The incoming radiation has a line width in the order of 1 megahertz and a center frequency which is determined from the laser line selected, the operating bandwidth of the laser and the Doppler shifts encountered over the propagation path.

Thus, selecting the 10.59 micron line of a $CO_2$ laser, the center frequency would be found to lie within approximately 30 megahertz of the 10.59 micron ($2.83 \times 10^{13}$ hertz) line. The Doppler shift involved for one-way propagation would be $(V_A+V_B+2V_C)/\lambda$ where $V_A$ is the speed of the source, $V_B$ is the speed of the receiver along the propagation path, $V_C$ is the speed of the target, and $\lambda$ is the wavelength of the laser signal. If $V_A+V_B+2V_C$ were 2000 meters-per-second (approximately Mach-6.0), then the Doppler shift would be 188.68 megahertz. Accordingly, the laser signal at the infrared dome or window 108 would be at a center frequency of $2.83 \times 10^{13} + 1.8868 \times 10^8$ hertz but with a bandwidth of 1 megahertz.

The reflected laser designator signal 200 incident upon the infrared dome or window 108 passes through the window to a beam splitter 202 and then to an infrared detector 204. Due to the high temperature of the window, flux 206 is emitted therefrom with the flux 206 from the window 108 also passing through the beam splitter 202 and being incident upon the infrared detector 204. For the above described $CO_2$ laser line, the incident laser radiation 200 is at a frequency of approximately $2.83 \times 10^{13} + 1.8868 \times 10^8$ hertz while the thermal radiation flux 206 from the infrared window 108 spans the frequency range from $2.5 \times 10^{13}$ to $3.75 \times 10^{13}$ hertz (12 microns to 8 microns).

For a simple heterodyne system, laser light from a local oscillator laser 208 derived from a laser operating on the same $CO_2$ laser line as the laser source to be detected (essentially a homodyne system) would also be incident on the infrared detector 204 upon reflection from a mirror 210 and the upper surface of the beam splitter 202. Upon mixing of the input laser light 200 to be detected and the light from the local oscillator 208, sum and difference frequencies are generated.

The difference frequency is $(2.83 \times 10^{13} + 1.8868 \times 10^8 + \Delta_1)$ hertz $- (2.83 \times 10^{13} + \Delta_2)$ hertz $= 1.8868 \times 10^8 + \Delta_1 - \Delta_2$ hertz, where $\Delta_1$ and $\Delta_2$ are the offsets of the laser light 200 to be detected and the laser light from the local oscillator laser 208 from the exact line center of the 10.59 micron line (or other line) of the $CO_2$ laser being utilized. However, the bandwidth of the signal continues to be approximately 1 megahertz. Thus, compared with broadband infrared signals (8 microns to 12 microns) the effective noise bandwidth is reduced from $3.75 \times 10^{13} - 2.5 \times 10^{13} = 1.25 \times 10^{13}$ hertz to $1 \times 10^6$ hertz by the heterodyne system so that noise due to the uniform background including the radiation flux from the high temperature window 108 is reduced by a factor of $10^7$.

In accordance with the present invention, the uncertainties $\Delta_1$ and $\Delta_2$ and the variable Doppler shift in the received laser signal 200 are accounted for to effectively expand the bandwidth of the system for initial signal acquisition by sweeping the output signal on the local oscillator laser 208 by means of an infrared modulator 212 which can shift the frequency by one of several known modulation techniques.

For example, a technique called "internal modulation" is described in *Laser Receivers* authored by Ross and published by McGraw Hill. For internal modulation, the laser is constructed of a an envelope containing a gas medium with a mirror reflector at both ends. By continuously propagating the optical beam through the excited gas medium such that it is reflected back on itself at each mirror, sufficient gain is produced to cause the system to oscillate. The frequency of oscillation is a function of the separation of the mirrors. By moving one mirror to a new position along the axis of the laser, a different lasing frequency is observed. Accordingly, one mirror may be mounted on a piezoelectric crystal with the crystal being driven at a frequency $F_1$ such that the laser frequency will be driven through a range of frequencies $F_0 \pm \Delta_F$. at the rate of $F_1$ hertz.

Alternately, with fixed mirrors, the length of the optical path can be changed by placing an electooptic crystal inside the laser cavity formed by the mirrors in line with the gas envelope or medium. If a voltage is placed across the crystal, the length of the crystal is changed. By applying a sawtooth voltage to the crystal, the output laser frequency can be swept over an interval proportional to the voltage range of the sawtooth waveform and in a time interval equal to the period of the sawtooth waveform. This technique is referred to as electrooptical frequency modulation. For the above $CO_2$ laser line example, the frequency can be shifted from $283286.12 \times 10^8$ hertz to $283288.12 \times 10^8$ hertz by means of the electrooptic frequency modulation technique.

Figure 2:
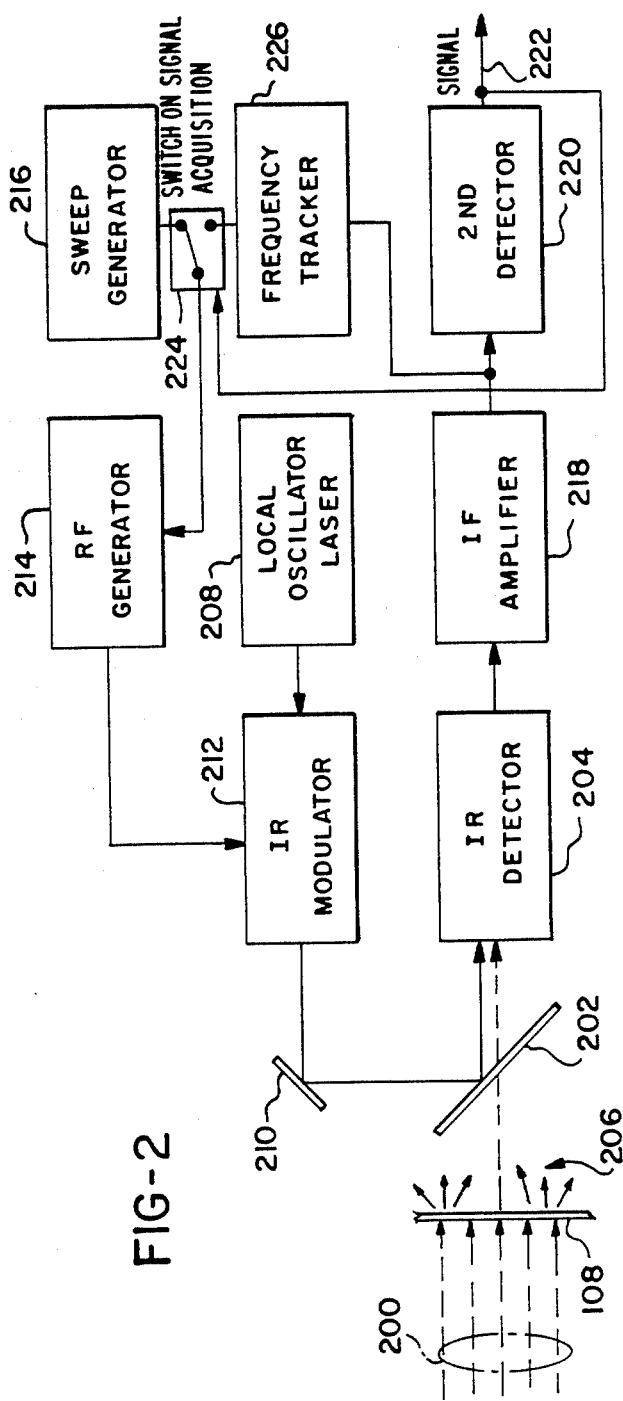
FIG. 2 is a block diagram of an improved heterodyne laser detection or seeking system in accordance with the present invention.

As shown in FIG. 2, the infrared modulator 212 is controlled by a variable radio frequency generator 214. In the initial search mode of the laser seeking system, the variable radio frequency generator 214 is repeatedly swept linearly over the frequency range defined by the laser light to be detected such as the previously described $CO^2$ laser line and by the uncertainties $\Delta_1$, $\Delta_2$ and the variable Doppler shift possible. The resulting heterodyned signals generated by the infrared detector 204 are amplified by an intermediate frequency amplifier 218 which has a limited passband corresponding to the laser signal to be detected.

The passband limits of the intermediate frequency amplifier 218 are determined by the frequency uncertainty of the Doppler reflected signal from the target aircraft 100, the laser designator 102 and the transient response of the target or frequency acquisition system. The transient response of the frequency acquisition system is in turn a function of the local oscillator sweep rate and frequency stability, the time on-target, and the rate of change of Doppler shift with illuminator target and missile accelerations. In X band (10 GHz) radar systems, bandwidths of approximately 100 hertz can be achieved Accounting for the factor of the $10^4$ reduction in wavelength in going to the laser wavelength will require an intermediate frequency bandwidth of $100 \times 10^4 = 1$ megahertz. Such limited passbands can readily be built into the intermediate frequency amplifier 218 in accordance with well known amplifier design techniques.

When the heterodyned signals resulting from the sweeping local oscillator laser 208 and the input laser light 200 are within the passband of the intermediate frequency amplifier 218, the amplified heterodyned signals are detected by a second detector 220 which in turn generates a laser or target acquisition signal on the conductor 222 if the amplified signals are above a defined threshold selected to ensure a true laser signal has been detected. Such thresholds depend upon the signal levels of a given system and can readily be determined by one skilled in the art. The target acquisition signal on the conductor 222 is passed to a control system (not shown) for the homing missile 106 to direct the missile to the target 100.

The target acquisition signal on the conductor 222 also causes the improved laser seeking system in accordance with the present invention to lock onto the laser signal being sought by means of a switch 224. Although shown as a mechanical switch, it is to be understood that the operation performed by the switch 224 is very rapid and appropriate electronic switching devices, well known to those skilled in the art, are actually employed. The switch 224 switches the control of the radio frequency generator 214 from the sweep generator 216 to a frequency tracker 226.

The frequency tracker 226 is a standard frequency modulation discriminator. The frequency modulation discriminator provides a frequency-to-voltage conversion, for example, as shown by the transfer function curve of FIG. 4. Depending on the direction of local oscillator sweep, a signal will be applied to the response curve initially near one of the extremes of the frequency range when the difference signal between the local oscillator and received signal fall within the passband of the intermediate frequency amplifier. In that case, a large output voltage positive for the case shown is generated in the discriminator. That voltage is then employed to drive the frequency controlling element or IR modulator 212 of the local oscillator laser 208 so that the output voltage is reduced to zero, i.e., the intermediate frequency signal is centered in the input frequency range at the point where the discriminator crosses the axis.

The frequency tracker 226 in response to amplified heterodyned signals within the passband of the intermediate frequency amplifier 218, determines the appropriate radio frequency signal to be generated by the radio frequency generator 214. Accordingly, the improved heterodyne laser seeking system of the present invention is locked to a target signal and the noise power is reduced by a factor of approximately $10^7$. From this description, it can be seen that the infrared modulator 212, the radio frequency generator 214, the sweep generator 216, the frequency tracker 226 and the switch 224 comprise means for controlling the local oscillator laser 208 in accordance with the present invention. It is noted that an appropriate bandpass filter could alternatively be designed into the detector 220 or partially into both the amplifier 218 and the detector 220 to provide the necessary passband limitation for the present invention.

It may be desirable to provide a narrow band optical filter 300 between the infrared window 108 and the beam splitter 202 or more appropriately the infrared detector 204 to help prevent saturation of the infrared detector 204 due to the radiating flux from the heated infrared window 108 if the detector 204 is sensitive to the infrared emissions from the heated window outside the desired passband of the system which is commonly the case. The narrow band infrared filter 300 may be constructed as a fixed bandpass infrared filter with a bandwidth of approximately 0.1 microns centered on the laser line employed. Such a filter provides a bandwidth of approximately $10^{11}$ hertz which is much greater than the bandwidth required to span the signal uncertainty due to the laser sources and the Doppler shifts.

While the form of apparatus herein described constitutes a preferred embodiment of this invention, it is to be understood that the invention is not limited to this precise form of apparatus and that changes may be made therein without departing from the scope of the invention which is defined in the appended claims.

What is claimed is:

1. An improved heterodyne laser detection system wherein a laser to be detected traverses a transmission path which contains a transmissive component at a high temperature comprising:
   local oscillator laser means;
   infrared light detector means positioned to receive light transmitted through said transmissive component and light from said local oscillator laser means for generating heterodyned signals in response thereto, said detector means also receiving thermal emissions from said transmissive component;
   intermediate frequency amplifier means for amplifying said heterodyned signals which are received from said infrared light detector means and are within a selected frequency passband;
   modulator means including radio frequency generator means for controlling the frequency of the output signal of said local oscillator laser means;
   sweep means for controlling said modulator means to repeatedly sweep the frequency of the output signal of said local oscillator laser means over a range of freuqencies corresponding to the laser signal to be detected to ensure that the laser signal to be detected generates heterodyned signals within the pass band of said intermediate frequency amplifier means;
   frequency tracker means for controlling said modulator means in response to amplified heterodyned signals from said intermediate frequency amplifier; and
   switch means for connecting said modulator means either to said sweep means or to said frequency tracker means, said switch means switching the connection of said modulator means from said sweep means to said frequency tracker means to thereby lock said laser detection system onto the laser to be detected.

2. The improved heterodyne laser detection system as claimed in claim 1 further comprising acquisition signal detector means for generating an acquisition signal in response to defined levels of heterodyned signals amplified by said intermediate frequency amplifier means, said switch means being responsive to said acquisition signal for switching from said sweep means to said frequency tracker means.

3. The improved heterodyne laser detection system as claimed in claim 2 further comprising an optical bandpass filter positioned between said transmissive component and said light detector means whereby emissions from said transmissive component incident upon said light detector means are reduced to improve the signal-to-noise ratio of the light signal reaching said light detector means.

4. The improved heterodyne laser detection system as claimed in claim 3 wherein said transmissive component comprises an infrared light receiving window of a high speed homing missile wherein said window is aerodynamically heated to high temperatures resulting in thermal emissions therefrom.

5. In a high speed homing missile having an infrared light receiving window which is aerodynamically heated to high temperatures resulting in thermal emissions from said window, an improved heterodyne laser seeking system comprising:
   local oscillator laser means;
   infrared light detector means positioned to receive light transmitted through said window and light from said local oscillator laser means for generating heterodyned signals in response thereto, said detector means also receiving thermal emissions from said window;
   intermediate frequency amplifier means for amplifying said heterodyned signals which are received from said infrared light detector means and are within a selected frequency passband;
   modulator means including radio frequency generator means for controlling the frequency of the output signal of said oscillator laser means;
   sweep means for controlling said modulator means to repeatedly sweep the frequency of the output signal of said local oscillator laser means over a range of frequencies corresponding to the laser signal being sought to ensure that the laser signal being sought generates heterodyned signals within the passband of said intermediate frequency amplifier means;
   frequency tracker means for controlling said modulator means in response to amplified heterodyned signals from said intermediate frequency amplifier; and
   switch means for connecting said modulator means either to said sweep means or to said frequency tracker means, said switch means switching the connection of said modulator means from said sweep means to said frequency tracker means to thereby lock said laser seeking system onto the laser being sought.

6. The improved heterodyne laser seeking system as claimed in claim 5 further comprising acquisition signal detector means for generating an acquisition signal in response to defined levels of heterodyned signals amplified by said intermediate frequency amplifier means, said switch means being responsive to said acquisition signal for switching from said sweep means to said frequency tracker means.

7. The improved heterodyne laser seeking system as claimed in claim 6 further comprising an optical bandpass filter positioned between said window and said light detector means whereby emissions from said window incident upon said light detector means are reduced to improve the signal-to-noise ratio of the light signal reaching said light detector means.

* * * * *